(12) United States Patent
Kim et al.

(10) Patent No.: US 7,460,453 B2
(45) Date of Patent: Dec. 2, 2008

(54) RECORDING MEDIUM, METHOD OF RECORDING AND/OR REPRODUCING SPEED INFORMATION ON A RECORDING MEDIUM, AND APPARATUS THEREOF

(75) Inventors: Jin Yong Kim, Seongnam-si (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/723,807

(22) Filed: Mar. 22, 2007

(65) Prior Publication Data

US 2007/0223345 A1 Sep. 27, 2007

Related U.S. Application Data

(63) Continuation of application No. 10/881,469, filed on Jul. 1, 2004.

(30) Foreign Application Priority Data

| Jul. 7, 2003 | (KR) | ...................... 10-2003-0045824 |
| Jul. 16, 2003 | (KR) | ...................... 10-2003-0048747 |
| Sep. 15, 2003 | (KR) | ...................... 10-2003-0063591 |
| Sep. 22, 2003 | (KR) | ...................... 10-2003-0065628 |

(51) Int. Cl.
*G11B 7/0045* (2006.01)

(52) U.S. Cl. ............... 369/47.36; 369/47.38; 369/47.27; 369/47.28; 369/189

(58) Field of Classification Search ............... 369/47.36, 369/47.38, 47.27, 47.28, 189
See application file for complete search history.

(56) References Cited

U.S. PATENT DOCUMENTS

| 5,361,173 | A | 11/1994 | Ishii et al. |
| 5,485,469 | A | 1/1996 | Suzuki |
| 5,590,096 | A | 12/1996 | Ohtsuka et al. |
| 5,636,631 | A | 6/1997 | Waitz et al. |
| 5,764,621 | A | 6/1998 | Choi |
| 5,835,462 | A * | 11/1998 | Mimnagh ................ 369/47.39 |
| 6,415,435 | B1 | 7/2002 | McIntyre |

(Continued)

FOREIGN PATENT DOCUMENTS

CN 1151071 A 6/1997

(Continued)

OTHER PUBLICATIONS

International Search Report issued Sep. 10, 2004 in corresponding International Patent Application No. PCT/KR2004/001574.

(Continued)

*Primary Examiner*—Tan X Dinh
*Assistant Examiner*—Thomas D Alunkal
(74) *Attorney, Agent, or Firm*—Harness, Dickey & Pierce

(57) ABSTRACT

A method for recording/reproducing data on/from a recording medium. The method provides for reading/recording speed information from a specific area of the recording medium, where the recording speed information includes a first information indicating a maximum recording speed, a second information indicating a minimum recording speed, a third information indicating a predetermined recording speed different from the maximum or minimum recording speed, and a fourth information indicating a basic recording speed. Thereafter, the method provides for recording/reproducing the data on/from the recording medium according to the reading/recording speed information.

14 Claims, 16 Drawing Sheets

U.S. PATENT DOCUMENTS

| | | | |
|---|---|---|---|
| 6,480,450 B1 | 11/2002 | Fujii et al. | |
| 6,487,713 B1 | 11/2002 | Cohen et al. | |
| 6,504,806 B1 | 1/2003 | Nakajo | |
| 6,535,470 B1 * | 3/2003 | Wu | 369/53.3 |
| 6,643,233 B1 | 11/2003 | Yen et al. | |
| 6,894,961 B1 | 5/2005 | Osakabe | |
| 6,996,047 B2 | 2/2006 | Nagano | |
| 6,999,393 B2 | 2/2006 | Yamada | |
| 7,012,878 B2 | 3/2006 | Shinotsuka et al. | |
| 7,075,871 B2 | 7/2006 | Kato et al. | |
| 7,170,841 B2 | 1/2007 | Shoji et al. | |
| 7,193,948 B2 | 3/2007 | Furukawa et al. | |
| 7,218,585 B2 | 5/2007 | Tanii et al. | |
| 2001/0044935 A1 | 11/2001 | Kitayama | |
| 2001/0053115 A1 | 12/2001 | Nobukuni et al. | |
| 2002/0021656 A1 | 2/2002 | Tsukagoshi et al. | |
| 2002/0044509 A1 | 4/2002 | Nakajima | |
| 2002/0048241 A1 | 4/2002 | Kumagai et al. | |
| 2002/0048646 A1 | 4/2002 | Tomura et al. | |
| 2002/0085470 A1 | 7/2002 | Yokoi | |
| 2002/0126604 A1 * | 9/2002 | Powelson et al. | 369/47.53 |
| 2002/0126611 A1 * | 9/2002 | Chang | 369/59.13 |
| 2002/0167880 A1 | 11/2002 | Ando et al. | |
| 2003/0021201 A1 * | 1/2003 | Kobayashi | 369/47.39 |
| 2003/0021202 A1 | 1/2003 | Usui et al. | |
| 2003/0058771 A1 | 3/2003 | Furukawa et al. | |
| 2003/0086345 A1 | 5/2003 | Ueki | |
| 2003/0137915 A1 | 7/2003 | Shoji et al. | |
| 2003/0151994 A1 | 8/2003 | Tasaka et al. | |
| 2003/0159135 A1 | 8/2003 | Hiller et al. | |
| 2003/0223339 A1 | 12/2003 | Taniguchi et al. | |
| 2003/0231567 A1 | 12/2003 | Moritomo | |
| 2004/0001407 A1 | 1/2004 | Kim et al. | |
| 2004/0004921 A1 * | 1/2004 | Lee et al. | 369/47.39 |
| 2004/0010745 A1 | 1/2004 | Lee et al. | |
| 2004/0022150 A1 * | 2/2004 | Lee et al. | 369/47.39 |
| 2004/0223434 A1 * | 11/2004 | Nishimura et al. | 369/47.53 |
| 2005/0019023 A1 | 1/2005 | Ko | |
| 2005/0036425 A1 | 2/2005 | Suh et al. | |
| 2005/0038957 A1 | 2/2005 | Suh | |
| 2006/0233059 A1 | 10/2006 | Suh et al. | |
| 2008/0043588 A1 | 2/2008 | Suh et al. | |

FOREIGN PATENT DOCUMENTS

| | | |
|---|---|---|
| EP | 0265984 | 10/1987 |
| EP | 0 552 903 | 7/1993 |
| EP | 0 968 769 A2 | 1/2000 |
| EP | 1 172 810 A2 | 1/2002 |
| EP | 1 244 097 A1 | 9/2002 |
| EP | 1 308 942 A2 | 5/2003 |
| EP | 1 329 888 A1 | 7/2003 |
| EP | 1 331 631 A1 | 7/2003 |
| EP | 1 361 571 A1 | 11/2003 |
| EP | 1 369 850 A1 | 12/2003 |
| EP | 1 471 506 A1 | 10/2004 |
| EP | 1 522 994 | 4/2005 |
| EP | 1 605 445 A2 | 12/2005 |
| JP | 09-160761 | 6/1997 |
| JP | 11-085413 | 3/1999 |
| JP | 2000-113458 | 4/2000 |
| JP | 2002-050053 | 2/2002 |
| JP | 2002-245625 | 8/2002 |
| JP | 2003-203341 | 7/2003 |
| JP | 2003-257026 | 9/2003 |
| WO | WO 97/13244 | 4/1997 |
| WO | WO 00/79525 A1 | 12/2000 |
| WO | WO 02/29791 A1 | 4/2002 |
| WO | WO 02/065462 A1 | 8/2002 |
| WO | WO 02/089123 A1 | 11/2002 |
| WO | WO 03/010519 A1 | 2/2003 |
| WO | WO 03/025935 A1 | 3/2003 |
| WO | WO 03/067581 A1 | 8/2003 |
| WO | WO 03/075265 A2 | 9/2003 |
| WO | WO 03/105139 A1 | 12/2003 |
| WO | WO 2004/013845 A1 | 2/2004 |
| WO | WO 2004/072966 | 8/2004 |
| WO | WO 2005/001819 A1 | 1/2005 |

OTHER PUBLICATIONS

Office Action dated Nov. 16, 2006 in corresponding Taiwanese Patent Application No. 093120351 and an English language translation of the same.

Office Action issued Jan. 29, 2008 by the Indian Patent Office in counterpart Indian Patent Application No. 438/KOLNP/2006.

Office Action issued Jan. 25, 2008 by the Japanese Patent Office in counterpart Japanese Patent Application No. 2006-523136.

Search Report issued Oct. 22, 2007 by the European Patent Office in counterpart European Patent Application No. 07016686.3-2210.

Search Report for counterpart European patent application No. 07120273.3-2210/1923870 dated Jul. 2, 2008.

* cited by examiner

FIG. 4A

| Byte number | contents | number of bytes |
|---|---|---|
| 0 | Disc Information identifier = "DI" | 2 |
| 5 | DI frame sequence number in DI block | 1 |
| N to N+4 | Recording Velocities for Vnom, Vmin, Vint, Vmax | 5 |
| M to 111 | Write strategy parameters for for Vnom, Vmin, Vint, Vmax | X |

Disc Information (112 bytes)

00h
01h
02h
03h
04h
05h
06h
07h ex. Vnom : 2x (Basic recording speed)
Vmax : 6x
Vmin : Vmax/2.4
Vint : Vmin *1.7

FIG. 4B

| Byte number | contents | Number of bytes |
|---|---|---|
| 0 | Disc Information identifier = "DI" | 2 |
| 5 | DI frame sequence number in DI block | 1 |
| 19 | Recording velocities For Vint | 1 |
| 20 to 23 | Write power settings at Vint (MS 4bytes) | 4 |
| 32 to 35 | Recording velocities For Vnom, Vmax, Vmin | 4 |
| 44 to 47 | Write power settings at Vint (LS 4bytes) | 4 |
| 48 to 71 | Write power settings at Vnom, Vmax, Vmin | 3 * 8 |
| 76 to 84 | dTtop first write pulse start time at Vnom, Vmax, Vmin | 3 * 3 |
| 89 to 97 | dTtop first erase pulse start time at Vnom, Vmax, Vmin | 3 * 3 |
| 99 to 101 | dTtop first write pulse start time at Vint | 3 |
| 102 to 104 | dTtop first erase pulse start time at Vint | 3 |
| 105 to 111 | reserved | |

Disc Information (112 bytes)

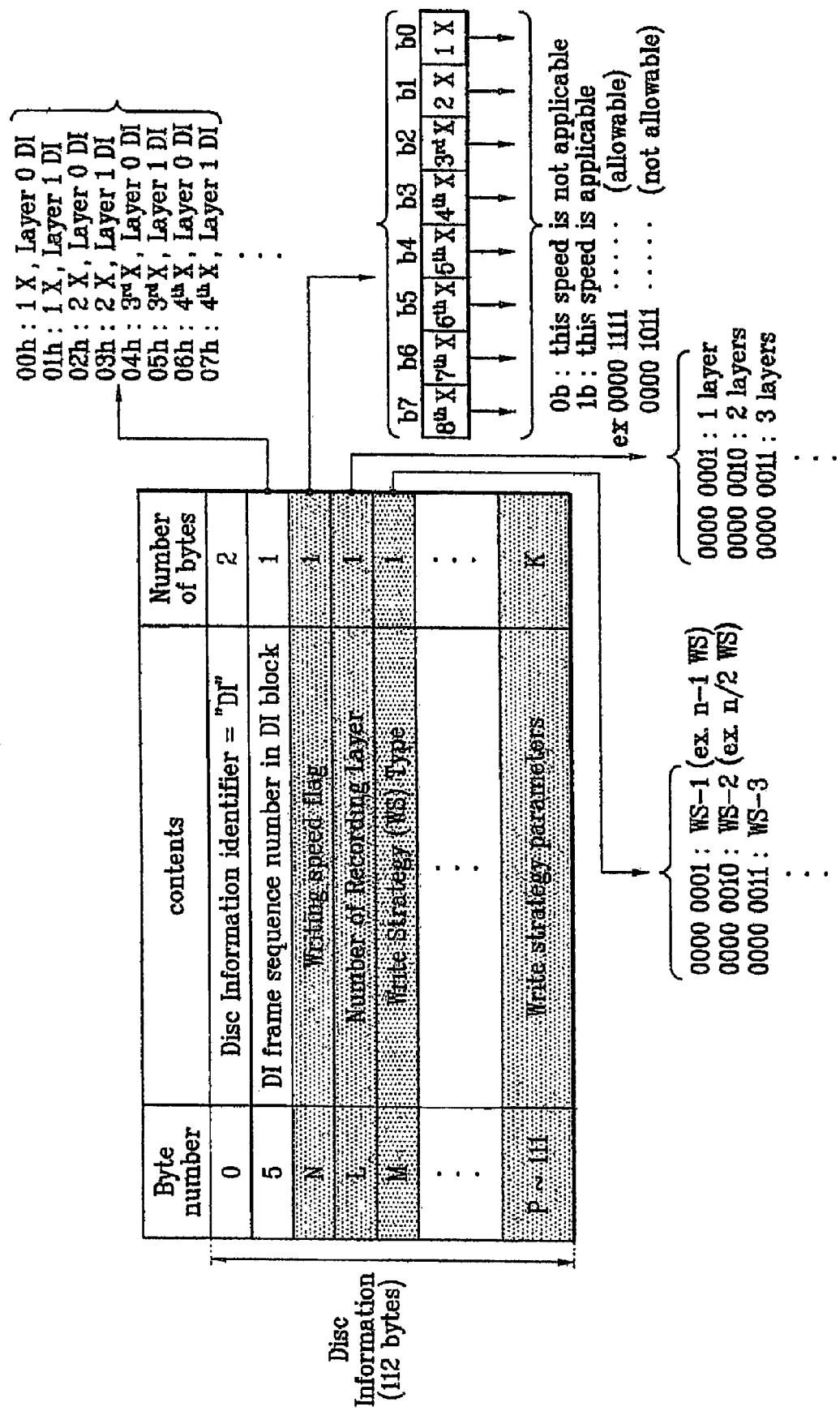

RECORDING MEDIUM, METHOD OF RECORDING AND/OR REPRODUCING SPEED INFORMATION ON A RECORDING MEDIUM, AND APPARATUS THEREOF

DOMESTIC PRIORITY INFORMATION

This is a continuation application of application Ser. No. 10/881,469 filed Jul. 1, 2004, the entire contents of which are hereby incorporated by reference.

FOREIGN PRIORITY INFORMATION

This application claims the benefit of the Korean Application No. 10-2003-0045824 filed on Jul. 7, 2003, Korean Application No. 10-2003-0048747 filed on Jul. 16, 2003, Korean Application No 10-2003-0063591 filed on Sep. 15, 2003, and Korean Application No. 10-2003-0065628 filed on Sep. 22, 2003 which are hereby incorporated by reference.

BACKGROUND OF THE INVENTION

1. Field of the Invention

The present invention relates to a method of recording control information on a recording medium, such as recordable optical disc having at least one recording layer, and more particularly, to a method in which record velocity information and write strategy parameters are included in the disc control information. Also, this invention relates to a method of recording or reproducing data on or from the recording medium using the writing speed information.

2. Discussion of the Related Art

A high density optical recording medium, known as HD-DVD, is widely used to record and store high-definition video data, large amount program data, and high-quality audio data and so one. The Blu-ray disc represents next-generation HD-DVD technology.

Technological specifications are now being established for the global standardization of the Blu-ray disc, including standards are for the write-once Blu-ray disc (BD-WO). Meanwhile, a rewritable Blu-ray disc, known as the 1'-speed BD-RE and now being discussed, should be compatible with BD-RE discs expected to have higher writing speeds, i.e., the 2×-speed BD-RE and beyond. BD-WO specifications for high recording velocity are also in progress. Efficient solutions for coping with the high writing speed of a high-density optical disc are urgently needed, and the specifications established should ensure mutual compatibility.

SUMMARY OF THE INVENTION

One exemplary embodiment relates to a method for recording/reproducing data on/from a recording medium. The method provides for reading and/or recording speed information from a specific area of the recording medium. The recording speed information includes a first information indicating a maximum recording speed, a second information indicating a minimum recording speed, a third information indicating a predetermined recording speed different from the maximum or minimum recording speed, and a fourth information indicating a basic recording speed. Thereafter, the method provides for recording/reproducing the data on/from the recording medium according to the reading/recording speed information.

One exemplary embodiment includes an apparatus for recording/reproducing data on/from a recording medium. A pick-up unit is used for reading and/or recording speed information from a specific area of the recording medium, where the recording speed information includes a first information indicating a maximum recording speed, a second information indicating a minimum recording speed, a third information indicating a predetermined recording speed different from the maximum or minimum recording speed, and a fourth information indicating a basic recording speed. A controller controls the recording/reproducing of the data according to the read recording speed information.

Another embodiment includes a method for recording/reproducing data on/from a recording medium. The method provides for reading control information from the recording medium, where the control information includes a first speed information indicating a maximum recording speed, a second speed information indicating a minimum recording speed, and a third speed information indicating one or more basic recording speeds, wherein the third speed information represents whether each of the basic recording speeds are applicable to the recording medium or not. Thereafter, the method provides for recording/reproducing the data on/from the recording medium according the read control information.

Another exemplary embodiment relates to an apparatus for recording/reproducing data on/from a recording medium. A pick-up unit is used for reading control information from the recording medium, where the control information includes a first speed information indicating a maximum recording speed, a second speed information indicating a minimum recording speed, and a third speed information indicating one or more basic recording speeds, wherein the third speed information represents whether each of the basic recording speeds are applicable to the recording medium or not. The apparatus also includes a controller for controlling recording/reproducing the data according to the read control information.

Additional advantages, objects, and features of the invention will be set forth in part in the description which follows and in part will become apparent to those having ordinary skill in the art upon examination of the following or may be learned from practice of the invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4C are diagrams of disc information recorded according to a first embodiment of the present invention;

FIGS. 7A to 7D are diagrams of recording disc information according to a third embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A Blu-ray disc is taken as an example of an optical disc according to the present invention. Yet, the concept of the present invention, characterized in an optical disc having its disc control information recorded thereon, is applicable to DVD-RAM, DVD-RW, DVD+RW, DVD-R, DVD+R, and similar such discs.

Although the terminology used herein is well known for the most part, some terms have been chosen by the applicant, such that the present invention should be understood with the intended meanings of the terminology as used by the applicant. For example, the "disc control information" of a disc is recorded in a specified area, i.e., a recordable area of the disc or a prerecorded area (sometimes known as an embossed area manufacturer, in which manufacturer data is recorded and where no further recording is possible), and includes information necessary for the playback of a recorded disc. Disc control information is called "disc information" or "DI" in relation to Blu-ray disc technology but is typically referred to as "physical format information" for DVD-RAM, DVD-RW, DVD+RW, DVD-R, and DVD+R discs. Hence, it should be apparent that the technical background of the present invention is equally applicable to physical format information.

Moreover, the disc information according to the present invention is recorded as an unspecified unit of information, which may be counted, for example, as a first or second information.

Figure 1:
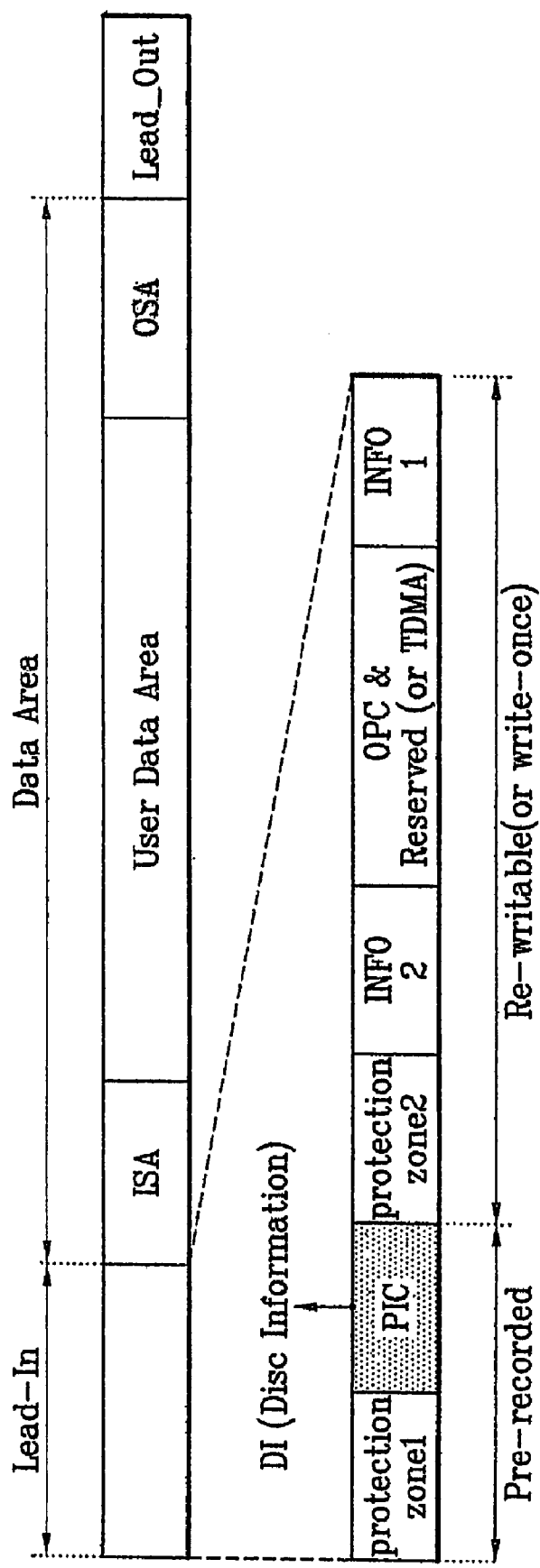
FIG. 1 is a diagram of a single-layer disc applicable to the present invention.
Figure 2:
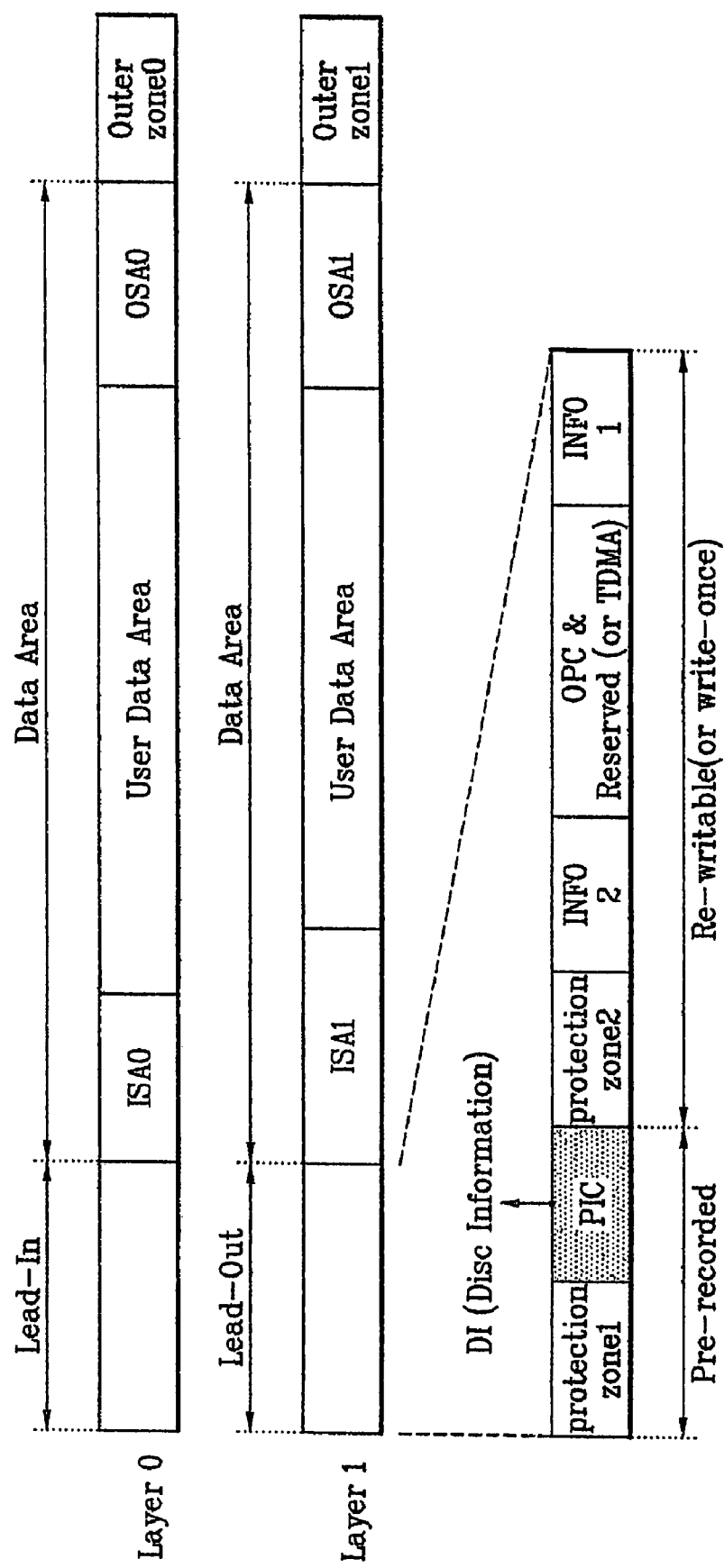
FIG. 2 is a diagram of a dual-layer disc applicable to the present invention.

FIGS. 1 and 2 illustrate the structure of optical discs according to the present invention, in which any recordable optical disc may be applicable to the present invention. The recordable disc may be, for example, a rewritable optical disc or a write-once optical disc.

Referring to FIG. 1, illustrating an optical disc having one recording layer, a lead-in area is provided as a management area on an inner circumference area of an optical disc, whereas a lead-out area is provided as a management area on an outer circumference area of the optical disc. In the inner circumference area, a pre-recorded area and a rewritable (or write-once) area are provided separately. In BD-RE and BD-WO technology, the pre-recorded area is called the PIC area, where permanent information and control data is recorded, and disc information is recorded in the PIC area. A data area is made up of a user data area where user data is recorded and inner and outer spare areas ISA and OSA, which are used in the replacement of the data of a defective area. In the case of a BD-WO disc, a temporary defect management area (TDMA) is provided for recording information of a defect and for general management. The TDMA is unnecessary in the case of BD-RE discs, which have a corresponding area designated as reserved.

The present invention intends to provide a method of recording disc information (DI) as disc control information required for recording and/or reproducing of a disc in a pre-recorded or recordable are. It is apparent that a recording method in the pre-record area is differently applied to each kind of disc. In the case of BD-RE and BD-WO discs, the pre-recorded area is the PIC area recorded using a bi-phased high-frequency modulated signal reproduced according to a specific playback method, to acquire the disc information.

FIG. 2 illustrates an optical disc having dual recording layers, in which an inner circumference area of the disc has a lead-in of a first recording layer (Layer 0) corresponding to a lead-out of a second recording layer (Layer 1). In this case, one PIC area is provided in each of the lead-in and lead-out areas, and the same disc information is recorded in each PIC area.

Figure 3:
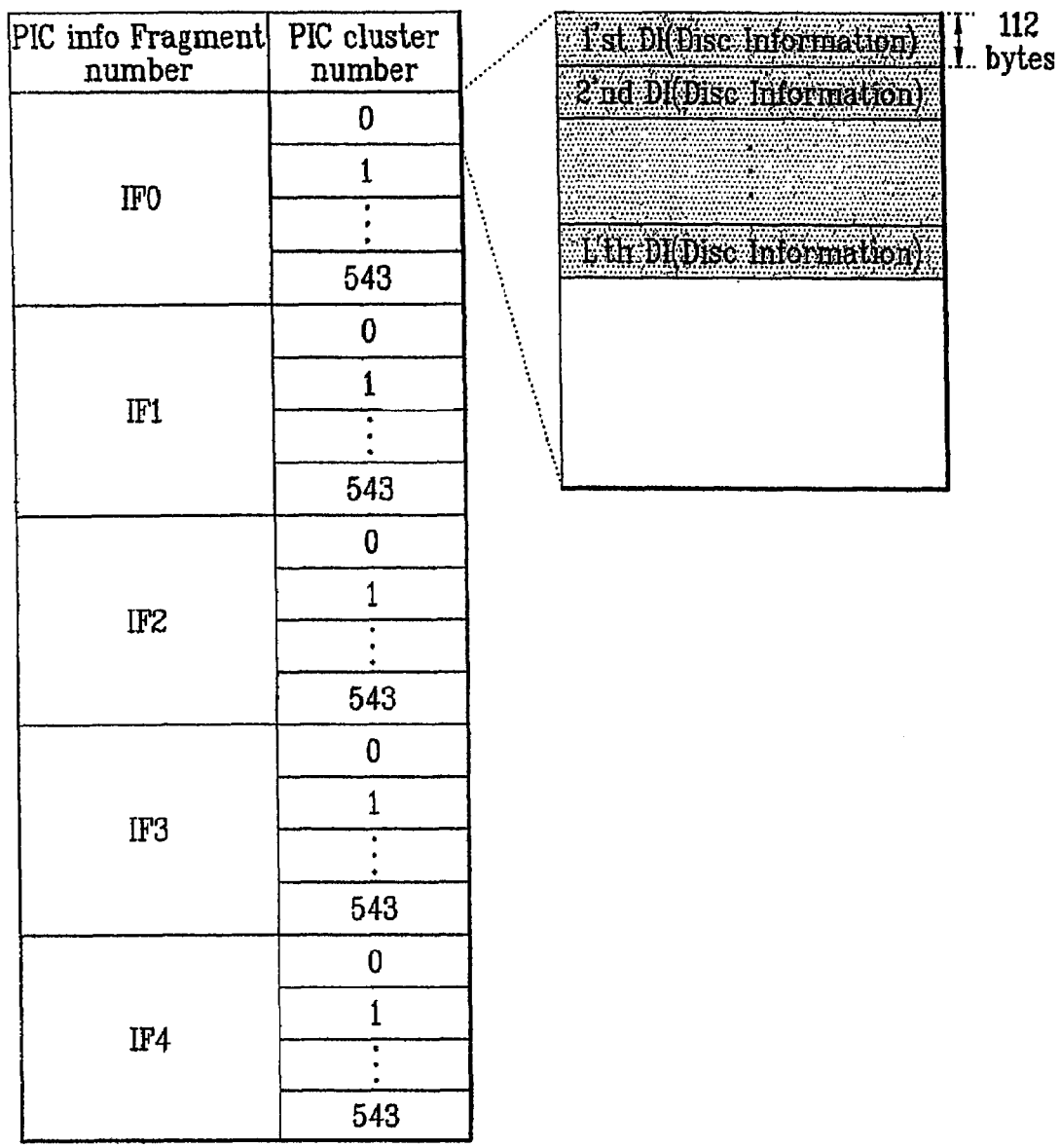
FIG. 3 is a diagram of a management area where disc control information of the present invention is recorded, in which a format of recording the disc information in a corresponding area is schematically shown.

FIG. 3 illustrates a PIC area formatted according to the present invention. In configuring the disc information of the PIC area of a BD-RE or BD-WO disc, the minimum recording unit is one cluster, 544 clusters constitute one fragment as one upper record unit, and five fragments make up the PIC area. Disc information is recorded in a front head cluster of a first fragment IF0. The disc information is plurally recorded per recording layer and recording velocity permitted by the corresponding optical disc. One disc information includes 112 bytes, sometimes referred to as a DI frame. To cope with a loss of disc information, the same contents of the disc information are repeatedly recorded in each front head cluster of the remainder of the fragments.

Information representing the corresponding recording layer, information representing recording velocity, and write strategy information corresponding to the recording velocity are included in each disc information. Such information is utilized in recording and reproducing the optical disc, to provide optimal recording power per recording layer and per recording velocity.

The disc information of the present invention is characterized in providing specific recording velocity information supported by the disc and associated write strategy information, and more specifically, in providing specific recording velocity supported for each recording layer and associated write strategy information via a specified method for discs having a plurality of recording layers.

The specific configuration of the disc information is for a Blu-ray disc, which may differ from the configuration of a DVD-based disc. Specifically, the recording DI volume for a Blu-ray disc is 112 bytes or equivalent. By formulating the disc information of the same recording layer as one information, i.e., without repeating any common information, the write strategy configuration may differ per recording velocity.

In addition to a method of recording specific parameters of the write strategy, a medium property of an optical disc is generally modified by applying a laser beam to a recording layer thereof via a pickup to perform recording. To do so, the laser beam's signal strength (recording power) and duration should be determined. Such information associated with recording is generally referred to as write strategy (WS) parameters for achieving a specific "write strategy."

FIGS. 4A-4C and 5A & 5B illustrate a first embodiment of the present invention of recording disc control information, in which various recording velocities to cope with high speed are grouped into one recording velocity group to be recorded.

The first embodiment of the present invention relates to a recording method of disc information coping with high speed, a method of recording data on an optical disc, and the like, and more particularly, to an advantageous method in coping with a constant angular velocity (CAV) system applicable to a high-speed disc. The present invention is not limited, however, to a CAV system.

In the CAV system, a disc is rotated at a constant speed such that the disc's inner and outer circumferences each have a rotational velocity corresponding to the length of the applied radius. For a Blu-ray disc, the velocity of the outer circumference is about 2.4 times greater than that of the inner circumference. Accordingly, if, for example, the recording on the inner circumference using a CAV system is performed at 1×-speed or 4×-speed, the outer circumference recording has to be performed at about 2.4×-speed or 9.6×-speed, respectively, and conversely, a 6×-speed recording on the outer circumference means that the inner circumference recording has to be performed at about 2.5×-speed. In other words, adoption of the CAV system requires a velocity differential between the disc's inner and outer circumferences, so that an optimal recording velocity and write strategy must be selected for recording according to the applicable disc location. Moreover, such information should be provided as specified disc information to utilize the optimal recording velocity and write strategy (WS) in a corresponding system.

FIG. 4A shows one embodiment of recording disc information by an optical disc control according to the present invention, in which a disc information structure is schematically illustrated.

Referring to FIG. 4A, each disc information sequence is determined by a sequence number and is recorded using one byte. For instance, the information is recorded in a fifth byte (i.e., the "DI frame sequence number in DI block," which can be represented as 00h, 01h, 02h, 03h, 04h, 05h, 06h, or 07h) of the disc information, where a fifth byte of 00h or 07h indicates a first or eighth disc information, respectively. In another meaning, the byte (e.g., $5^{th}$ byte) deciding the sequence of the disc information can be defined to mean not only the sequence but also an applicable recording velocity in a specific recording layer. For instance, '00h' means 1× speed disc information of a first recording layer, '01h' means 1× speed disc information of a second recording layer, and the like.

Moreover, in a specific area within the disc information, recording velocity information designated by the corresponding disc information and write strategy (WS) coping with the corresponding recording velocity are written in a previously promised specific location. For instance, the recording velocity information of the corresponding disc information is written in $N^{th} \sim (N+4)^{th}$ bytes and the write strategy (WS) coping with the corresponding recording velocity is written in $M^{th} \sim 111^{th}$ bytes.

Specifically, the present invention is characterized in providing disc information coping with high recording velocity, the recording velocity information and write strategy (WS) are written for each of a plurality of recording velocity information, namely, an optimal recording velocity Vnom, a maximum recording velocity Vmax, a minimum recording velocity Vmin, and an intermediate recording velocity Vint.

At optimal recording velocity, the basic recording speed information is written, and a basic recording speed generally starts at 2×-speed in a high-speed disc. As an applicable recording speed increases, so does the basic recording speed.

At maximum recording velocity, information associated with maximum recording velocity applicable by a corresponding disc is written. At minimum recording velocity, information associated with recording speed found by dividing the maximum recording velocity applicable by the corresponding disc by '2.4' is written. At intermediate recording velocity, information associated with recording speed found by multiplying the minimum recording velocity by '1.7' is written.

A relation of determining recording velocity values of the maximum, minimum, and intermediate recording velocities is decided for convenience of explanation by considering a radius ratio between inner and outer circumferences of BD applicable to the present invention. It is apparent that such a relation can be variably applied to other kinds of discs and that the recording velocity values can be set to different values according to disc characteristics despite the same BD.

Relating to the optimal recording velocity (2× speed), the same information is preferably recorded in each disc information. Preferably, the maximum, minimum, and intermediate recording velocities are differently determined according to the maximum recording velocity value applicable by the corresponding disc information.

Moreover, it is able to set up the intermediate recording velocities plurally. The present invention is characterized in having at least one intermediate recording velocity. Hence, at least four recording velocity information are included in one disc information. The more the recording velocity information exist, the more advantageous it becomes for the system operation. Hence, by utilizing a recordable area within disc information to the maximum, many intermediate recording velocity information are preferably provided thereto.

FIG. 4B shows a specific recording method for disc information having a plurality of per recording velocity information according to the present invention like FIG. 4A, in which disc information is written while maintaining compatibility with 1×-speed BD-RE disc information under discussion and in which there exists one intermediate recording velocity information for example.

Three kinds of recording velocities such as optimal recording velocity (Vnom), maximum recording velocity (Vmax), and minimum recording velocity (Vmin) are written in $32^{nd} \sim 35^{th}$ bytes within disc information according to a predetermined definition. Write power information as write strategy (WS) for each of the three kinds of recording velocities is recorded in $48^{th} \sim 71^{st}$ bytes. A start time of a write pulse as another write strategy (WS) coping with each of the three kinds of recording velocities is recorded in $76^{th} \sim 84^{th}$ bytes. A start time of an erase pulse as another write strategy (WS) coping with each of the three kinds of recording velocities is recorded in $89^{th} \sim 97^{th}$ bytes.

In addition to the basic three kinds of recording velocities Vnom, Vmax, and Vmin, the present invention further records at least one information associated with the intermediate recording velocity Vint, which is recorded using a reserved area within disc information. For instance, the intermediate recording velocity is recorded in $19^{th}$ byte according to a predetermined definition, write power information is recorded as write strategy (WS) coping with the intermediate recording velocity in total 8-bytes of $20^{th} \sim 23^{rd}$ bytes and $44^{th} \sim 47^{th}$ bytes, a start time of a write pulse as another write strategy (WS) coping with the intermediate recording velocity is recorded in $99^{th} \sim 101^{st}$ bytes, and a start time of an erase pulse as another write strategy (WS) coping with the intermediate recording velocity is recorded in $102^{nd} \sim 104^{th}$ bytes.

As explained in the foregoing description, if a plurality of intermediate recording velocities are intended to be recorded, information associated with another intermediate recording velocity can be recorded in a reserved area within disc information as well.

Figure 4C:
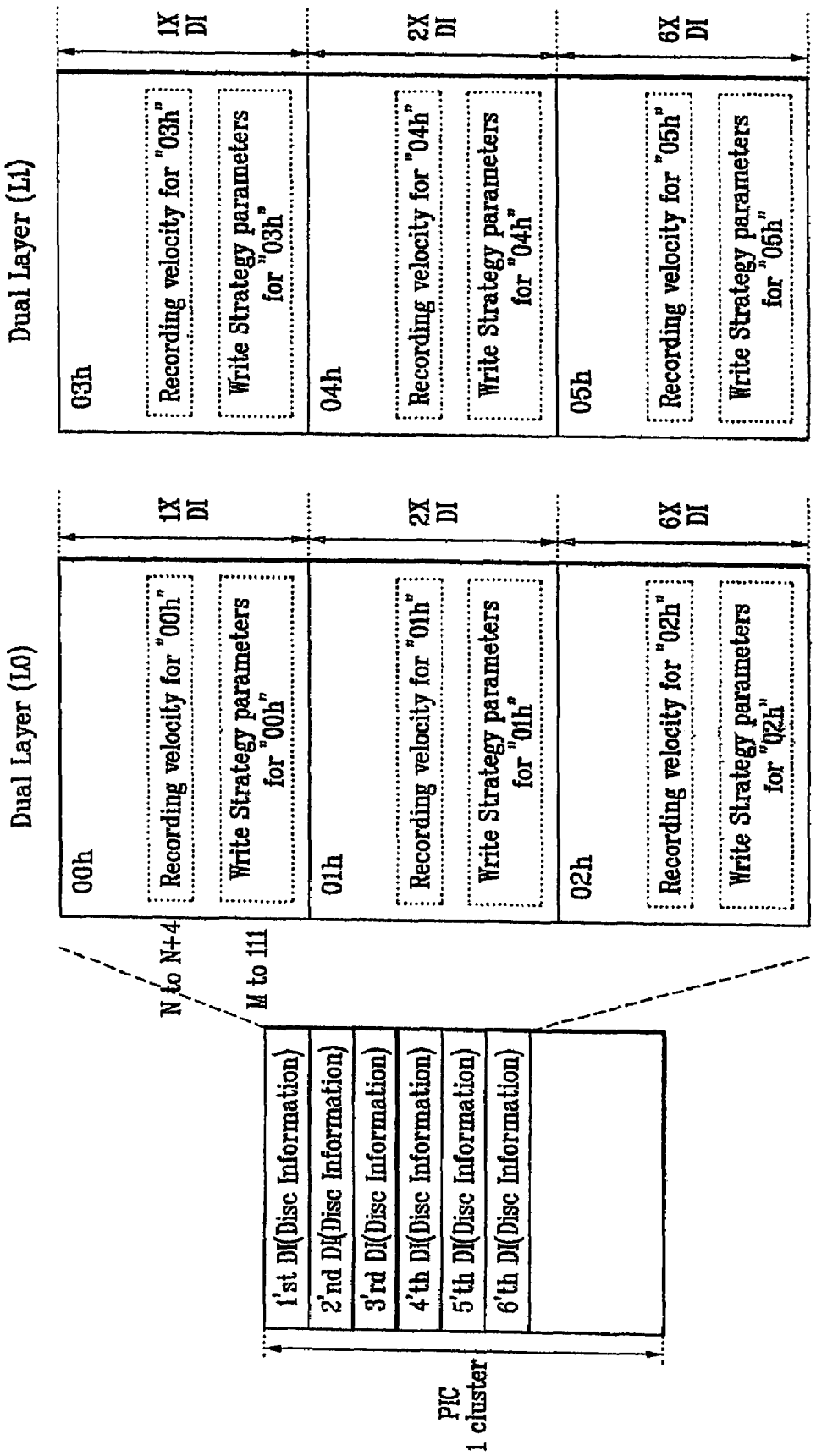

FIG. 4C schematically shows disc information recorded in case of recording the disc information of FIG. 4A, and more particularly, in case of a dual layer having two recording layers. The same principle can be applied to a single layer having one recording layer.

For instance, when an optical disc needs three different recording velocity information per recording layer, six disc information corresponding to each recording velocity are required. Each disc information allocates to record a sequence number, recording velocity information corresponding to the sequence number, and a write strategy (WS) in a predetermined area.

For instance, if recording velocities to be represented are 1×-speed, 2×-speed, and 6×-speed, first, second, and third disc information mean the disc information for the first recording layer. The $1^{st}$ disc information is 1×-speed disc information of the $1^{st}$ recording layer and has a sequence number of '00h'. The corresponding recording velocity and write strategy are recorded in a previously promised location, whereby the recording velocity information is recorded in $N^{th}$~$(N+4)^{th}$ bytes and the write strategy is recorded in $M^{th}$~$111^{th}$ bytes.

The $2^{nd}$ disc information is 2× speed disc information of the $1^{st}$ recording layer and has a sequence number of '01h'. The corresponding recording velocity and write strategy are recorded in a previously promised location like the $1^{st}$ disc information. The third disc information is 6× speed disc information of the $1^{st}$ recording layer and has a sequence number of '02h'. The corresponding recording velocity and write strategy are recorded in a previously promised location like the $1^{st}$ or $2^{nd}$ disc information.

Meanwhile, $4^{th}$ to $6^{th}$ disc information mean disc information for $2^{nd}$ recording layer. The $4^{th}$ disc information is 1× speed disc information of the $2^{nd}$ recording layer and has a sequence number of '03h'. The $5^{th}$ disc information is 2× speed disc information of the $2^{nd}$ recording layer and has a sequence number of '04h'. The $6^{th}$ disc information is 6× speed disc information of the $2^{nd}$ recording layer and has a sequence number of '05'. The correspoding recording velocity and write strategy of each of the $4^{th}$ to $6^{th}$ disc information are recorded in the same location.

The first embodiment of the present invention shown in FIGS. 4A to 4C is described by taking an example of recording a plurality of the recording velocity information and per recording velocity write strategies (WS) within one disc information. If necessary, one write strategy (WS), associated with specific recording velocity information, may be recorded in one disc information, and the remainder recorded in another disc information.

For instance, in case that four kinds of recording velocity information are required, the disc information are needed four times more than those of the above-described embodiment of the present invention. Yet, the PIC area, as shown in FIG. 3. is an area sufficient for recording a multitude of 112-bytes disc information therein so that sufficiently large amount of disc information can be recorded therein if necessary. Hence, if one write strategy (WS) is recorded within the disc information, it is advantageous in allocating more areas for recording intermediate recording velocity therein.

On the contrary, it is possible to record information commonly recorded in each disc information as common information once and to change to record the per recording velocity write strategies only.

Figure 5A:
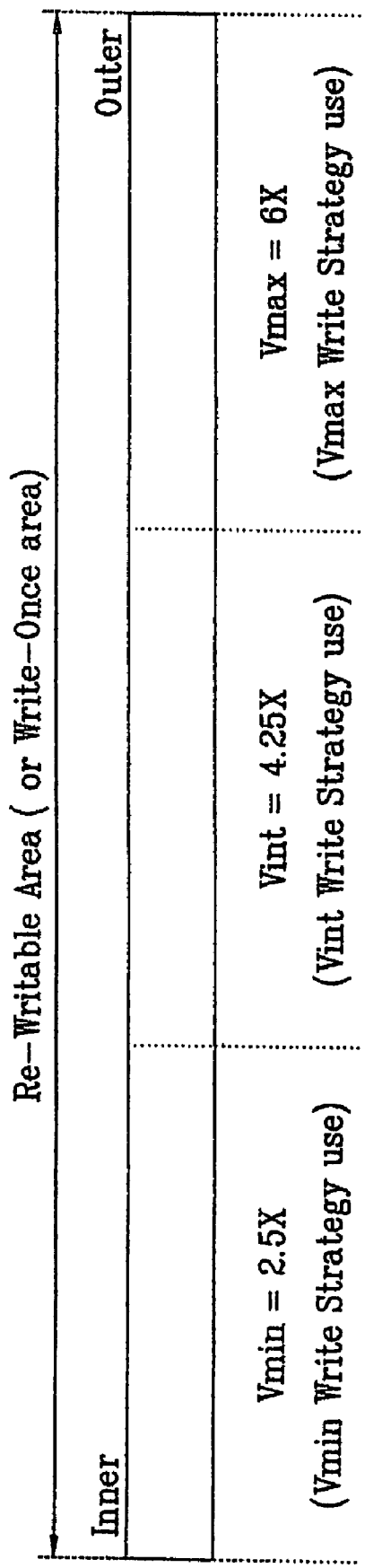
FIGS. 5A and 5B are diagrams of a disc recording method according to the first embodiment of the present invention.
Figure 5B:
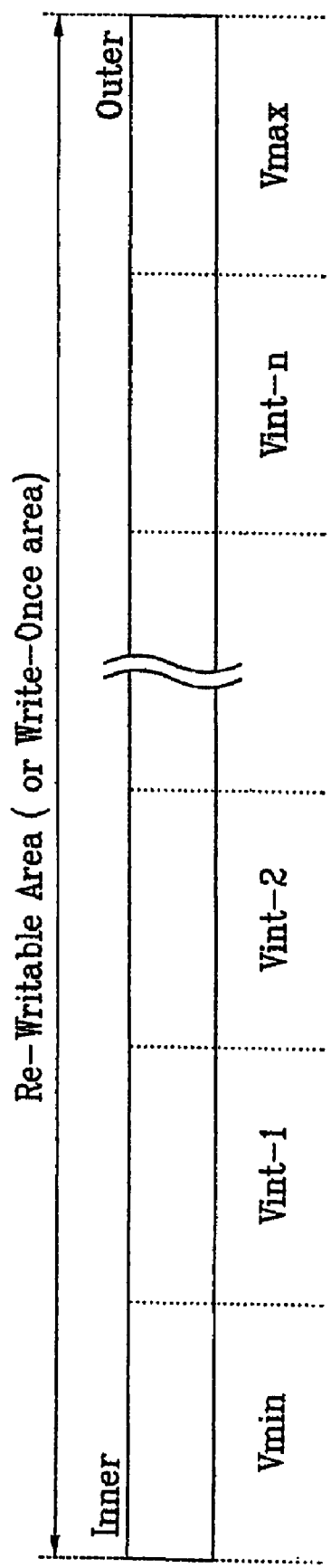

FIG. 5A and FIG. 5B are diagrams of a recording method of performing a recording on an optical disc according to the first embodiment of the present invention. FIG. 5A relates to a case of using one intermediate recording velocity, and FIG. 5B shows an example of using at least two intermediate recording velocities.

Namely, once an optical disc is loaded in an optical record/playback unit, write strategies respectively associated with maximum recording velocity (Vmax), minimum recording velocity (Vmin), and intermediate recording velocity (Vint) are read out as disc control information within the optical disc.

A recordable area between an inner circumference and an outer circumference is virtually divided into three sections. The maximum recording velocity (Vmax), minimum recording velocity (Vmin), and intermediate recording velocity (Vint) are applied to an outer circumference area, an intermediate area, and an inner circumference area, respectively, to perform a recording thereon. This means that the recording is performed by applying an appropriate recording velocity and write strategy (WS) associated with the corresponding recording velocity to a specific area, where the recording will be performed, to adjust write power, write pulse timing, and the like.

For instance, if a maximum recording velocity applicable by a disc is 6×-speed, disc information associated with 6× speed is read out. In case that the maximum recording velocity (Vmax) is 6×-speed, 2.5×-speed for a minimum recording velocity (Vmax/2.4) and 4.25× speed for an intermediate recording velocity (1.7Vmin) are recorded within the disc information as well as write strategies for the respective recording velocities. A record/playback unit previously confirms the recording velocity and write strategy (WS), which will be applied to a specific area where a recording will be performed, thereby enabling to quickly cope with the write strategy (WS) in performing the recording on the corresponding area and to reduce probability of error occurrence using the optimal recording velocity.

FIG. 5B schematically shows a method of performing a recording on an optical disc in case that a plurality of intermediate recording velocities are recorded within disc information. A recordable area of an optical disc is virtually divided into a plurality of sections as many as a number of recording velocities within disc information except Vnom. Maximum recording velocity (Vmax) and minimum recording velocity (Vmin) are applied to an outer circumference area and an inner circumference area, respectively, to perform a recording thereon. An intermediate area of the disc is divided into areas as many as the number of the set intermediate recording velocities to apply the intermediate recording velocities Vint-1~Vint-n thereto, respectively. Thus, the corresponding recording is performed on the divided areas. Hence, an optimal recording velocity to the corresponding section is determined, whereby the recording is enabled using the determined write strategy (WS) per the corresponding decided recording velocity.

Figure 6A:
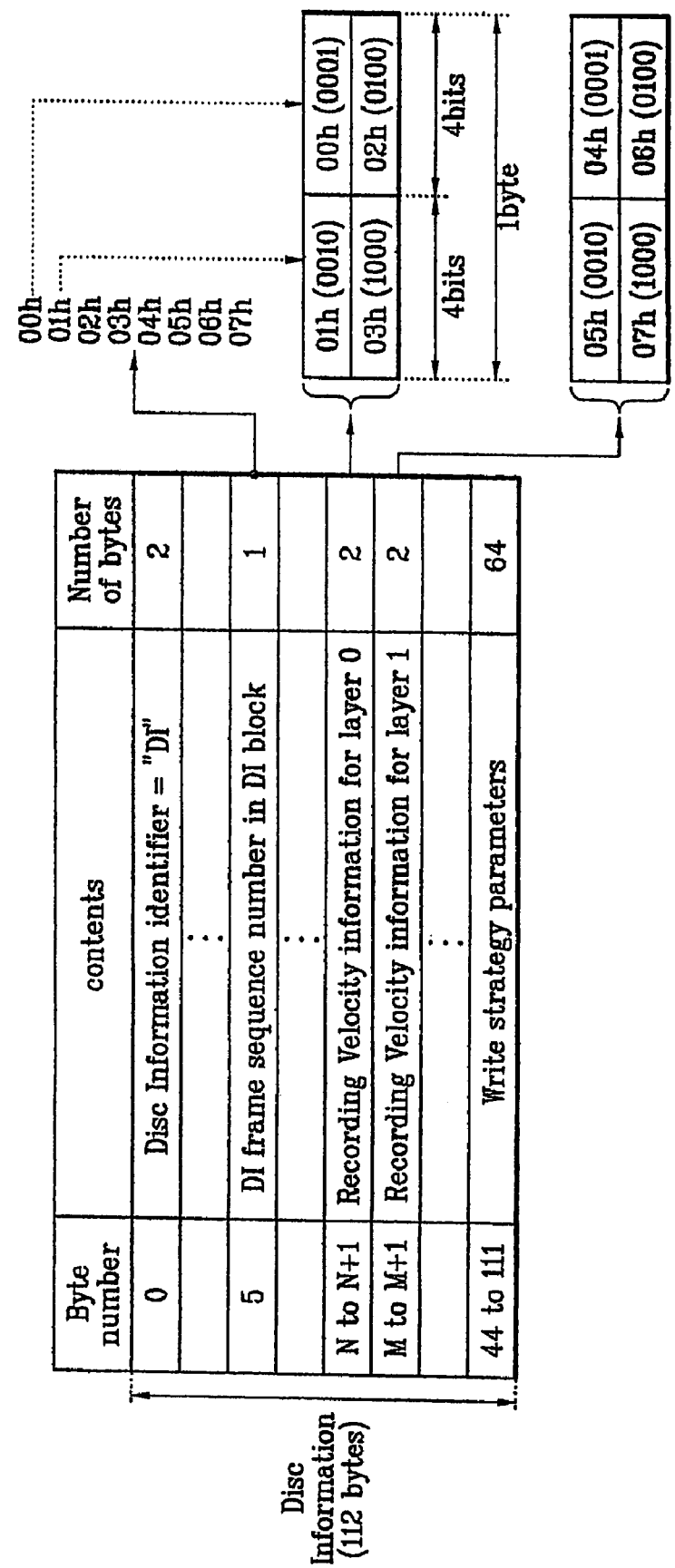
FIGS. 6A to 6C are diagrams of recording disc information according to a second embodiment of the present invention.
Figure 6B:
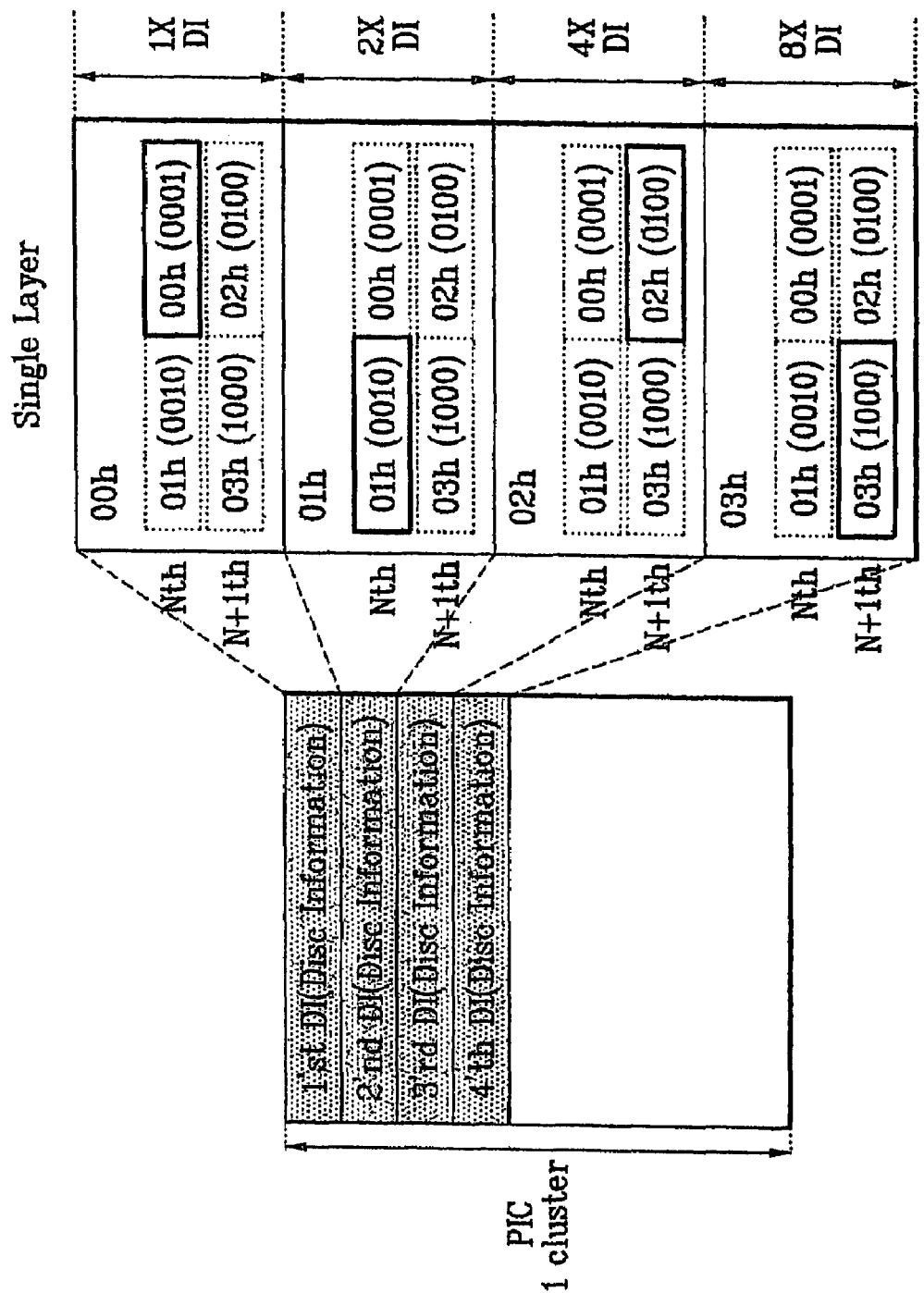
Figure 6C:
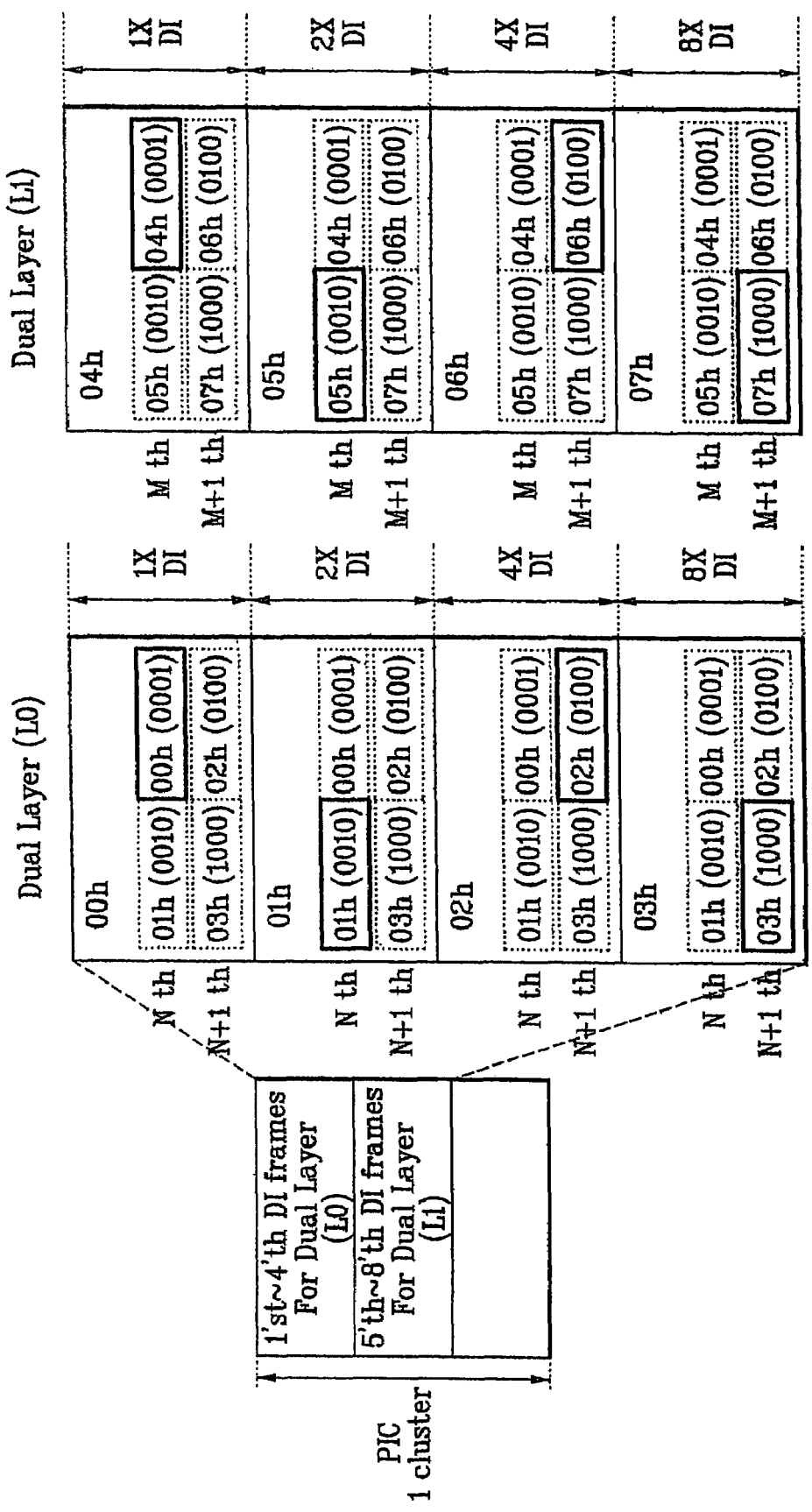

FIGS. 6A to 6C illustrate a second embodiment of the present invention of recording disc control information, in which recording velocity information indicating a corresponding recording velocity and a write strategy corresponding to the recording velocity are recorded within each disc information to cope with high speed.

FIG. 6A shows one example of recording disc information of an optical disc according to a third embodiment of the present invention, in which a disc information structure is schematically illustrated.

Referring to FIG. 6A, a sequence of each disc information is decided by a sequence number, and the corresponding sequence is written by 1-byte. For instance, the corresponding information is recorded in $5^{th}$ byte within the disc information, which is named 'DI frame sequence number in DI block' field and is briefly represented by '00h, 01h, 02h, . . . '. Namely, the information of the $5^{th}$ byte is defined in a following manner. First of all, if the information of the $5^{th}$ byte is '00h', '00h' means $1^{st}$ disc information. '07h' means $8^{th}$ disc information.

In a specific area within the disc information, each recording velocity information allowed by a disc is represented by a specific bit to be recorded in a previously promised specific location within the disc information. For instance, if a corresponding disc needs four different recording velocity information per recording layer, 4-bits are allocated to one recording velocity each, recording velocity information for the first recording layer (Layer 0) is recorded in $N^{th}$ and $(N+1)^{th}$ bytes within the disc information, and recording velocity information for $2^{nd}$ recording layer Layer1 is recorded in $M^{th}$ and $(M+1)^{th}$ bytes within the disc information. If the disc has a single layer, the $M^{th}$ and $(M+1)^{th}$ bytes are set to 'zero' value. If at least four kinds of different recording velocity information are required, bytes such as $N^{th}$ byte, $(N+1)^{th}$ byte, $(N+2)^{th}$ byte, and the like are additionally allocated to use.

Therefore, the recording velocity corresponding to its sequence number, as shown in FIG. 6A, is recorded in a previously promised specific location, whereby it is facilitated to confirm the recording velocity information possessed by the corresponding disc information. Moreover, the remaining bytes, e.g., $44^{th}$~$111^{th}$ bytes, are utilized to record write power, write parameters, and the like in detail.

FIG. 6B schematically shows disc information recorded in case of representing the recording velocity information like FIG. 6A, and more particularly, in case of a single layer. If an optical disc requires four kinds of different recording velocity information, four disc information corresponding to each recording velocity are needed. Each of the disc information is recorded by allocating 4-bits to a sequence number and 4-bits to recording velocity corresponding to the sequence number.

For instance, if recording velocities to be represented are 1× speed, 2× speed, 4× speed, and 8× speed, respectively, $1^{st}$ disc information has a sequence number corresponding to '00h' to represent a corresponding recording velocity by '0001b' indicating 1× speed, $2^{nd}$ disc information has a sequence number corresponding to '01h' to represent a corresponding recording velocity by '0010b' indicating 2× speed, $3^{rd}$ disc information has a sequence number corresponding to '02h' to represent a corresponding recording velocity by '0100b' indicating 4× speed, and $4^{th}$ disc information has a sequence number corresponding to '03h' to represent a corresponding recording velocity by '1000b' indicating 8× speed. In doing so, each recording velocity is represented by binary information. Hence, if 4-bits each is allocated, a maximum applicable recording velocity (represented by '1111b') will be 15× speed. If the maximum applicable recording velocity exceeds 16× speed, at least 5-bits each should be allocated.

Since the single layer is shown in FIG. 6B, $M^{th}$ and $(M+1)^{th}$ bytes representing recording velocity information for $2^{nd}$ recording layer Layer1 are set to 'zero' to be handled as unused information.

FIG. 6C schematically shows disc information recorded in case of representing the recording velocity information like FIG. 6A, and more particularly, in case of a dual layer. If an optical disc requires four kinds of different recording velocity information, total eight disc information corresponding to each recording velocity are needed. Each of the disc information is recorded by allocating 4-bits to a sequence number and 4-bits to recording velocity corresponding to the sequence number.

For instance, if recording velocities to be represented are 1× speed, 2× speed, 4× speed, and 8× speed, respectively, $1^{st}$ disc information has a sequence number corresponding to '00h' to represent a corresponding recording velocity by '0001b' indicating 1× speed, $2^{nd}$ disc information has a sequence number corresponding to '01h' to represent a corresponding recording velocity by '0010b' indicating 2× speed, $3^{rd}$ disc information has a sequence number corresponding to '02h' to represent a corresponding recording velocity by '0100b' indicating 4× speed, and $4^{th}$ disc information has a sequence number corresponding to '03h' to represent a corresponding recording velocity by '1000b' indicating 8× speed. The $1^{st}$ to $4^{th}$ disc information are information for the $1^{st}$ recording layer (Layer 0) and are recorded in $N^{th}$ and $(N+1)^{th}$ bytes of disc information, and 4-bits represent each recording velocity by binary information.

Likewise, recording velocity information can be represented for $2^{nd}$ recording layer in the same manner, which is recorded in $M^{th}$ and $(M+1)^{th}$ bytes. Namely, $5^{th}$ disc information has a sequence number corresponding to '04h' to represent a corresponding recording velocity by '0001b' indicating 1× speed, $6^{th}$ disc information has a sequence number corresponding to '05h' to represent a corresponding recording velocity by '0010b' indicating 2× speed, $7^{th}$ disc information has a sequence number corresponding to '06h' to represent a corresponding recording velocity by '0100b' indicating 4× speed, and $8^{th}$ disc information has a sequence number corresponding to '07h' to represent a corresponding recording velocity by '1000b' indicating 8× speed.

In the second embodiment, write strategy for write power, write parameters, and the like fitting each recording velocity is recorded in a rest area within the disc information as well as the recording velocity information. Hence, within one disc information, a sequence number of the corresponding disc information, recording velocity information represented by the corresponding disc information, write strategy (WS) coping with the corresponding recording velocity, and the like are recorded respectively.

Besides, in representing the recording velocity information like the second embodiment, $5^{th}$ byte information is previously defined as a specific recording velocity so that recording velocity information is recorded in $N^{th}$, $(N+1)^{th}$, $M^{th}$, and $(M+1)^{th}$ bytes to confirm it.

For instance, it is previously defined that '00h' of $5^{th}$ byte information means '1× speed disc information of $1^{st}$ recording layer' and that '07h' of $5^{th}$ byte information means '8× speed disc information of $2^{nd}$ recording layer'. Four bits are allocated to each of the $N^{th}$, $(N+1)^{th}$, $M^{th}$, and $(M+1)^{th}$ bytes so that an accurate recording velocity value is recorded as '0001b' (1× speed) or '0100b' (8× speed). Thus, it is reconfirmed that the corresponding disc information is 1×- or 8×-speed.

FIGS. 7A to 7D are diagrams of recording disc information according to a third embodiment of the present invention, in which applicable recording speed information is recorded to cope with high speed.

In order to acquire disc information associated with a specific writing speed of an intended specific recording layer from a plurality of existing disc information, the entire disc information should be read to take a lot of time. For instance, if there are four recording layers and eight writing speed applicable per recording layer, total thirty-two disc information are needed. A record/playback unit should search the entire disc information amounting to thirty-two whenever a value of the disc information for the specific recording layer and writing speed is needed. Hence, the present invention is characterized in recording 'disc-applicable writing speed information' and 'recording layer information existing in a disc' within disc information to enable a disc information search by a specified method using the recorded information.

Namely, the 'disc-applicable writing speed information' and 'recording layer information existing in a disc' are identically recorded within each disc information in common and a sequence of a plurality of disc information is decided using these information, thereby facilitating to acquire disc information related to the specific recording layer and writing speed to be searched.

Moreover, one write strategy (WS) is recorded within each disc information and identification information for identifying a kind or type of the corresponding write strategy (WS) is separately recorded, whereby a record playback apparatus (FIG. 8) is facilitated to use the write strategy (WS). Moreover, by selecting to record one write strategy (WS) for a specific writing speed and a specific recording layer in disc information, a disc manufacturer can be provided with convenience.

A method of recording disc information according to a third embodiment of the present invention is explained by referring to FIGS. 7A to 7D as follows.

FIG. 7A shows a schematic structure of disc information for explaining a method of recording disc information according to a third embodiment of the present invention.

Referring to FIG. 7A, a sequence for disc information each is decided by a sequence number and is recorded by 1-byte. For instance, the information is recorded in $5^{th}$ byte within disc information, is named 'DI frame sequence number in DI block' field, and is briefly represented by '00h, 01h, 02h, . . . '.

Namely, if the information of the $5^{th}$ byte is '00h', it means $1^{st}$ disc information. If the information of the $5^{th}$ byte is '07h', it means $8^{th}$ disc information. A meaning of the sequence of the $5^{th}$ byte will be decided by $N^{th}$ and $L^{th}$ bytes that will be explained later.

Writing speed information applicable by a corresponding disc is recorded in a specific area ($N^{th}$ byte) within disc information which is named 'Writing speed flag' field. For instance, whether a specific writing speed of eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed.

For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}×$, $4^{th}×$, $5^{th}×$, $6^{th}×$, $7^{th}×$, $8^{th}×$) to 5×, 6×, 8×, 12×, 14×, and 16× speeds, respectively.

Hence, if the corresponding disc allows the writing speeds up to the $4^{th}$ writing speed, it will be written as 'Writing speed flag=0000 1111b'. Yet, if the corresponding disc allows not the $3^{rd}$ writing speed but the $4^{th}$ writing speed, 'Writing speed flag=0000 1011b' is not allowed. Namely, in the 'Writing speed flag' field, if upper bits are set to '1b', the corresponding lower bits should be set to '1b'. Hence, it means that lower bits are not set to '0b' despite '1b' of upper bits.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the rest area (4-bits) of the $L^{th}$ byte.

Moreover, identification information for identifying a kind of write strategy (WS) recorded in $P^{th}$~$111^{th}$ bytes is written in another specific area ($M^{th}$ byte) within the disc information, which is named 'Write Strategy (WS) Type' field.

Namely, in the disc information of the present invention, one write strategy (WS) is recorded for a specific writing speed and a specific recording layer and the write strategy is optionally selected from various kinds of specified write strategy types by a disc manufacturer. Hence, if the corresponding disc information is a first type write strategy WS-1, '0000 0001' is written in the $M^{th}$ byte. If the corresponding disc information is a second type write strategy WS-2, '0000 0010' is written in the $M^{th}$ byte. And, substantial write strategy (WS) is recorded in $P^{th}$~$111^{th}$ bytes. Yet, the substantial write strategy (WS) will be recoded as a value interoperating with the decided write strategy (WS) type in the $M^{th}$ byte. The write strategy (WS) type via the $M^{th}$ byte is optionally recordable in every disc information. And, it is also possible to apply one specified write strategy (WS) type in 1× speed disc information, which is expected to be supported by every record playback apparatus (FIG. 8), in a mandatory manner.

And, the write strategy (WS) can be recorded in various ways. As a disc becomes highly densified and has higher speed, a writing speed, i.e., disc RPM) as well as medium properties of recording layer is considerably affected. Hence, a more accurate system is requested. And, the various write strategies (WS) are explained as follows for example.

First of all, there is a system having a write pulse smaller by '1' than a recording mark size (n) formed on a recording layer medium, which may be called '(n−1) WS'. Secondly, there is a system having a write pulse having a size amounting to a half of the recording mark size (n), which may be called 'n/2 WS'. Besides, new write strategies (WS) keep being developed. Regarding the different kinds or types of write strategies (WS), when there exist the various write strategy (WS) types exist as parameters applied to the write strategies (WS) differ from each other, a disc manufacturer tests write power according to the write strategy (WS) recorded in the selected $M^{th}$ byte and then records a result of the test as write strategy (WS) in the Pth~$111^{th}$ bytes within the disc information.

From the above-recorded 'writing speed information' of the $N^{th}$ byte and the 'recording layer information' of the $L^{th}$ byte, the record playback apparatus (FIG. 8) recognizes how many disc information exist within the corresponding disc. Namely, the number of the existing disc information is found by multiplying an applicable writing speed number by the number of recording layers. As the present invention applies one write strategy (WS) for a specific writing speed and a specific recording layer, the type and number of the write strategy (WS) may not be taken into consideration in deciding the number of disc information.

The above-decided information about the number of total disc information can be recorded in a specific area (e.g., $4^{th}$ byte or the like) (not shown in the drawing) within the disc information as well.

Hence, it is able to program a plurality of the above-decided disc information such that the sequence (which is written in the $5^{th}$ byte as mentioned in the foregoing description) of the disc information is decided by the sequence numbers and such that each of the disc information designates the previously decided writing speed and recording layer by the sequence.

For example, by knowing that four writing speeds applicable by a disc exist if the $N^{th}$ byte is '0000 1111' and that two recording layers exist within the disc if the $L^{th}$ byte is '0000 0010', total eight disc information are needed so that the sequence will be '00h~07h'. And, it is previously decided that disc information of '00h', '01h', '02h', '03h', '04h', '05h', '06h', and '07h' relate to '1× speed, $1^{st}$ recording layer', '2× speed, $2^{nd}$ recording layer', '2× speed, $1^{st}$ recording layer', '2× speed, $2^{nd}$ recording layer', '$3^{rd}$ writing speed, $1^{st}$ recording layer', '$3^{rd}$ writing speed, $2^{nd}$ recording layer', '$4^{th}$ writing speed, $1^{st}$ recording layer', and '$4^{th}$ writing speed, $2^{nd}$ recording layer', respectively.

In the above-explained example, the writing speed is preferentially taken into consideration. Yet, it is apparent that the recording layer can be preferentially taken into consideration.

Hence, in order to acquire the disc information for a specific target writing speed and a specific target recording layer, the record playback apparatus (FIG. 8) is facilitated to check which disc information is related to the specific target writing speed and recording layer from 'writing speed information' of the $N^{th}$ byte and 'recording layer information' of the $L^{th}$ byte commonly recorded within the respective disc information instead of playing back to check the entire disc information.

Figure 7B:
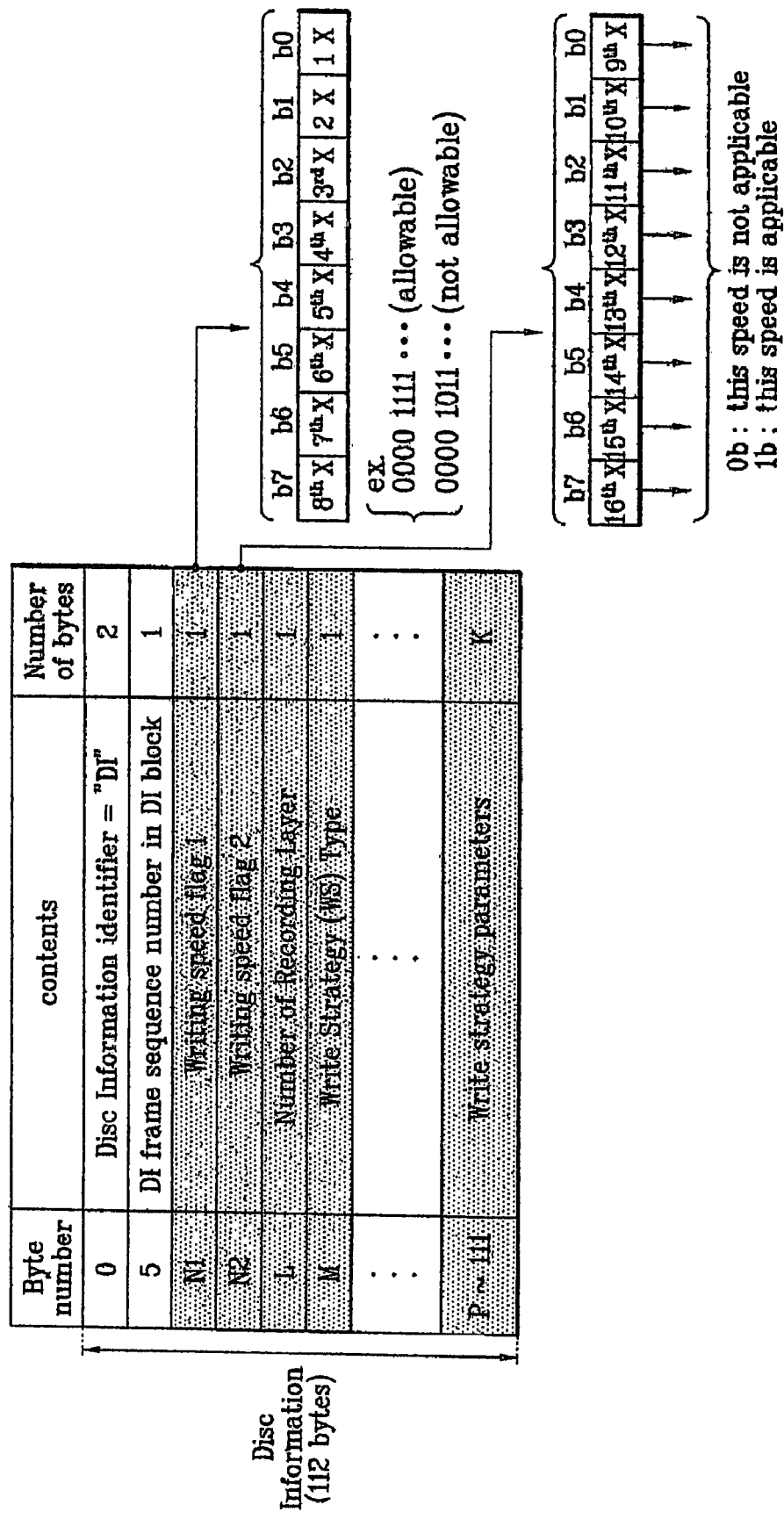

FIG. 7B shows an example of extending the third embodiment of the present invention in FIG. 7A. In case that writing speeds applicable by a disc exceed eight kinds, the $N^{th}$ byte ('Writing speed flag' field) in FIG. 7A is extended to indicate presence or non-presence of applicability of $1^{st}$~$8^{th}$ writing speeds by a flag in $N1^{th}$ byte ('Writing speed flag 1' field), and another byte is allocated to display presence or non-presence of applicability of $9^{th}$~$16^{th}$ writing speeds by a flag in $N2^{th}$ byte. Contents written in the rest bytes are equivalent to those of the third embodiment of the present invention in FIG. 7A, thereby being skipped in the following description.

Figure 7C:
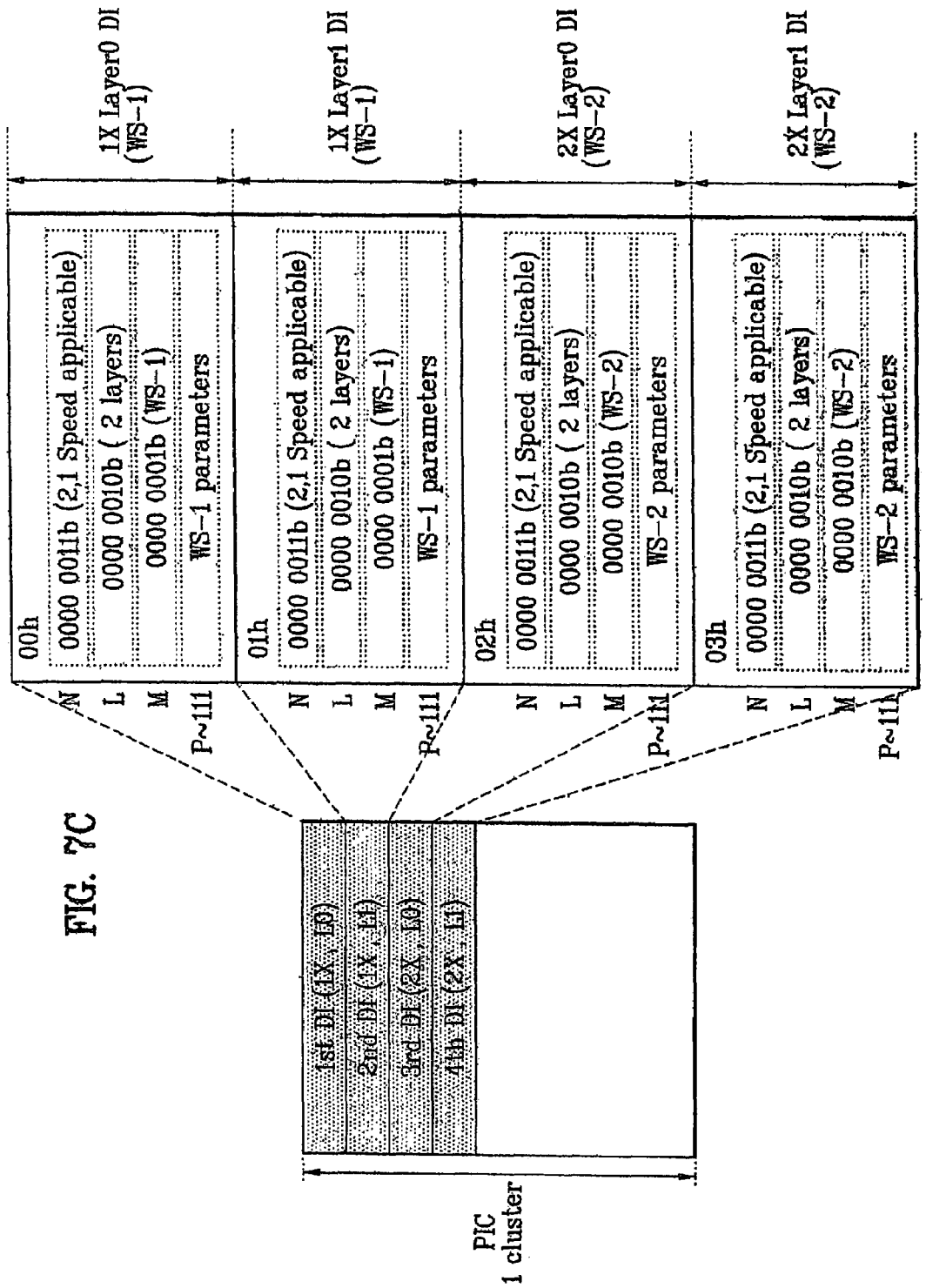

FIG. 7C shows an example of recording disc information by the third embodiment of the present invention in FIG. 7A. It can be known that there are two (1×, 2×) applicable writing speeds from $N^{th}$ byte ('0000 0010b') commonly recorded in the entire disc information and that two recording layers exist within a disc from $L^{th}$ byte ('0000 0010b').

Hence, in the example of FIG. 7C, total four disc information (two recording layers*two writing speeds) exist and a sequence of the disc information becomes '00h'(1×,L0)→'01h'(1×,L1)→'02h'(2×,L0)→'03h'(2×,L1). This is a specified content according to a predetermined sequence and, as mentioned in the foregoing description, can be rendered into a different sequence by a specification.

An intrinsic write strategy (WS) is recorded in other bytes within each disc information as well as in $N^{th}$ and $L^{th}$ bytes. Specifically, information of a type of write strategy (WS) written in $P^{th}$~$111^{th}$ bytes within the corresponding disc information is recorded in $M^{th}$ byte. Namely, information written in the $M^{th}$ byte and the $P^{th}$~$111^{th}$ bytes can differ in each disc information.

In the example in FIG. 7C, '00h' (1×,L0) and '01h' (1×,L1) relate to the application of a first type write strategy (WS-1) and '02h' (2×,L0) and '03h' (2×,L1) relate to the application of a second type write strategy (WS-2).

Figure 7D:
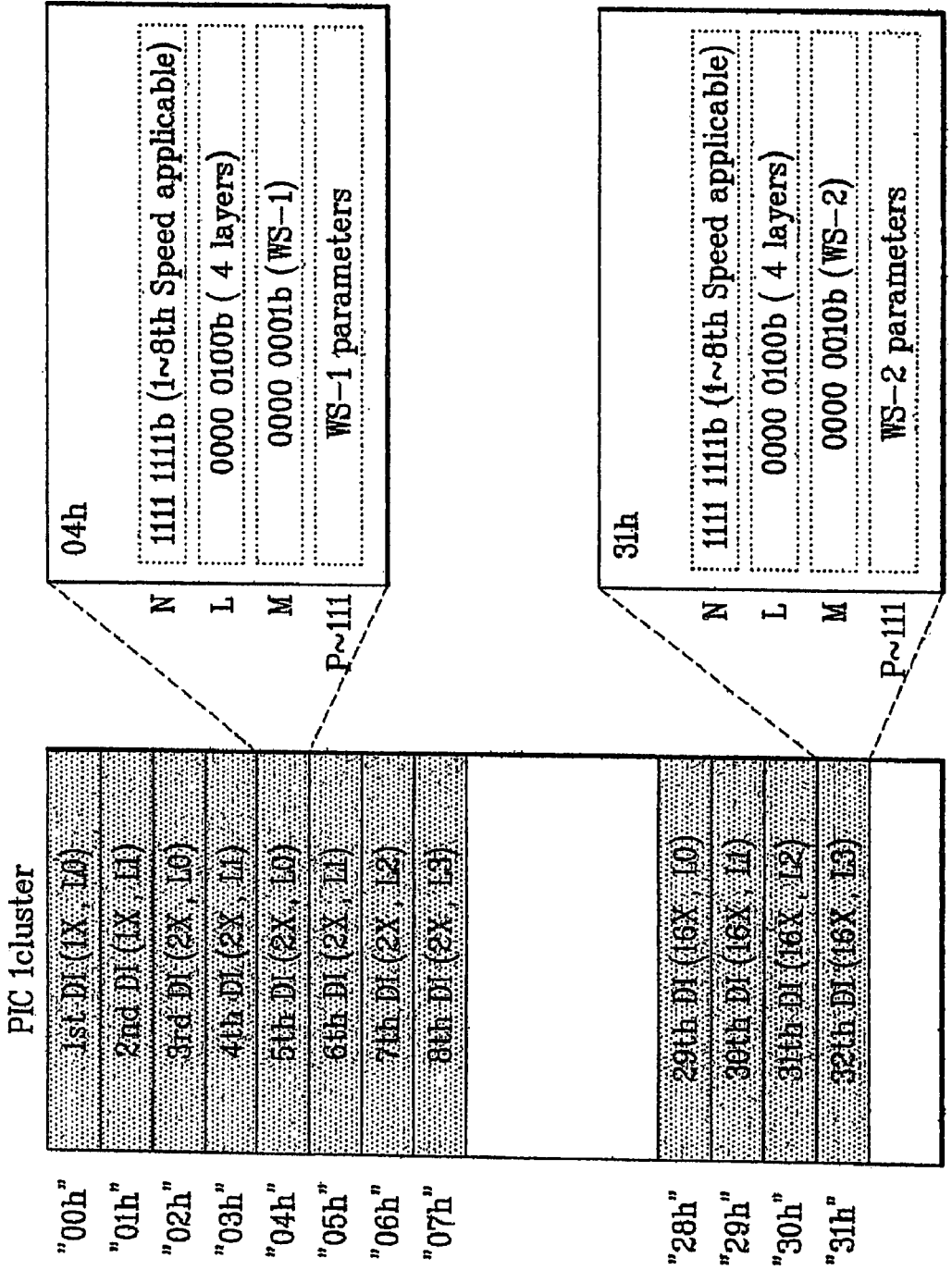

FIG. 7D shows another example of recording disc information according to the third embodiment of the present invention in FIG. 7A. It can be known that there are eight (1×, 2×, . . . , 16×) applicable writing speeds from $N^{th}$ byte ('1111 1111b') commonly recorded in the entire disc information and that four recording layers exist within a disc from $L^{th}$ byte ('0000 0100b'). Hence, in the another example of FIG. 7D, total thirty-two disc information (four recording layers*eight writing speeds) exist and a sequence of the disc information becomes '00h'(1×,L0)→'01h'(1×,L1)→'02h'(1×, L2)→'03h'(1×,L4)→'04h'(2×,L0)→ . . . →'31h'(16×,L4).

An intrinsic write strategy (WS) is recorded in other bytes within each disc information as well as in $N^{th}$ and $L^{th}$ bytes. Specifically, information of a type of a write strategy (WS) written in $P^{th}$~$111^{th}$ bytes within the corresponding disc information is recorded in $M^{th}$ byte. Namely, information written in the $M^{th}$ byte and the $P^{th}$~$111^{th}$ bytes can differ in each disc information.

In the another example of FIG. 7D, if a record playback unit (FIG. 8) intends to search disc information related to 2× speed (2×,L0) of a first recording layer to perform a recording by applying a write strategy (WS) within the corresponding disc information, it can be known from the information in the $N^{th}$ and $L^{th}$ bytes commonly recorded in the entire disc information that total thirty-two disc information (four recording layers*eight writing speeds) exist in the corresponding disc according to the sequence of the disc information such as '00h'(1×,L0)→'01h'(1×,L1)→'02h'(1×,L2)→'03h'(1×, L4)→'04h'(2×,L0)→ . . . →'31h'(16×,L4).

Hence, the record playback apparatus (FIG. 8) enables to recognize that the disc information related to the 2× speed (2×,L0) of the first recording layer to be searched is '04h' and that the corresponding disc information ('04h') is recorded as the first type write strategy (WS-1_ from the write strategy (WS) type identification information ('0000 0002b') recorded in the $M^{th}$ byte within the corresponding information ('04h'), thereby reading out parameter values of the first type write strategy (WS-1) via the $P^{th}$~$111^{th}$ bytes to utilize in the recording.

Likewise, if intending to search disc information related to 16× speed (16×,L3) of a fourth recording layer to perform recording by applying a write strategy (WS) within the corresponding disc information, the record playback unit (FIG. 8) recognizes that the corresponding disc information is '31h' via the same process and that the write strategy type (WS) is the second type (WS-2), thereby enabling to utilize them in the recording.

Therefore, if a host or a control unit ('20' in FIG. 8) intends to perform a recording on a specific recording layer at a specific writing speed, the record playback apparatus (FIG. 8) is facilitated to search the corresponding disc information, thereby enabling to confirm the write strategy (WS) recorded within the corresponding disc information.

For reference, the information of the first and third embodiments can be recorded within the disc information (DI) together or within separate disc control information (not shown in the drawing), respectively. In this case, the applicable speed information disclosed in the third embodiment may have a priority. This is to decide by the information disclosed in the third embodiment whether a corresponding specific writing speed is applicable because a portion of maximum writing speed, minimum writing speed, nominal writing speed, and other writing speed information may not be substantially applicable.

Figure 8:
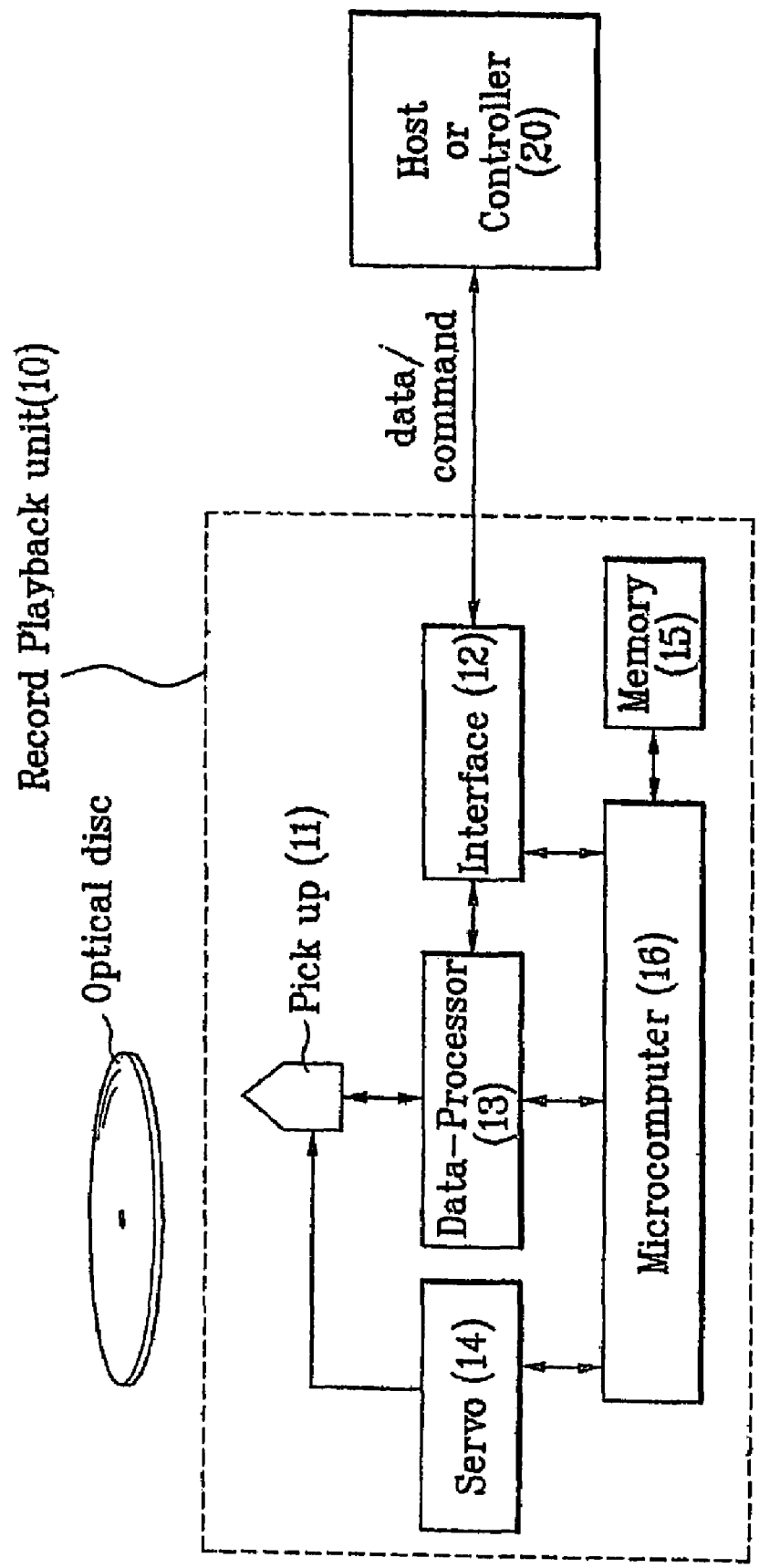
FIG. 8 is a block diagram of an optical disc recording and reproducing apparatus using disc control information according to the present invention.

FIG. 8 illustrates an optical disc recording and reproducing apparatus using disc control information according to the present invention. The recording and reproducing apparatus comprises a record/playback unit 10 for recording data on and reproducing data from an optical disc and a controller 20 for controlling the record/playback unit 10. The controller 20 generates a record or playback command for a specific area, and the record/playback unit 10 caries out the record/playback function for the specific area accordingly. The record/playback unit 10 includes an interface 12 for communicating with an external device, i.e., the controller (or host); a pickup 11 for performing read and write operations with respect to the optical disc; a data processor 13 for modulating the pickup's input signal for performing a recording operation and for demodulating the pickup's output signal for performing a reproduction operation; a servo 14 for controlling the read and write operations of the pickup; a memory 15 for temporarily storing disc control information and user data to be recorded or read; and a microcomputer 16 for respectively controlling each element of the record/playback unit.

In the above system, it is also possible to control the recording and/or reproducing of data without the control unit 20. In that case, the Microcomputer 16 may control all units in the record/playback unit 10 as performing the function of the control unit 10.

In a recording data on an optical disc according to the present invention, the optical disc recording and reproducing apparatus first reads the entire disc management area of an inserted optical disc, the read information being disc information of the present invention, which is temporarily stored in the memory 15. Thus, the recording layer information, recording velocity information, and write strategy fitting the corresponding recording velocity are read out and temporarily stored.

If intending to perform a writing on a specific area within the optical disc, the controller 20 renders such an intent into a writing command and then delivers it to the record/playback unit 10 together with data for writing location information to be recorded. After receiving the writing command, the microcomputer 16 decides the corresponding recording velocity applied to an intended recording layer within the optical disc from the management information stored in the memory 15 and then performs the writing command using the most optimal write strategy by referring to the determined recording velocity.

Specifically, in case that the recording is performed on the optical disc by the first embodiment of the present invention, the microcomputer 16 performs the recording in a manner of applying a different per writing speed write strategy (WS) to each area within the disc by considering the maximum, intermediate, minimum, and other writing speeds.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recording/reproducing data on/from a recording medium, comprising:
   reading recording speed information from a specific area of the recording medium, the recording speed information including a first information used to indicate a first recording speed as a maximum recording speed, a second information used to indicate a second recording speed as a minimum recording speed, a third information used to indicate a third recording speed as a predetermined recording speed different from the maximum and minimum recording speeds, and a fourth information used to indicate a fourth recording speed as a basic recording speed, wherein at least one basic recording speed has to be supported by the recording medium;
   recording/reproducing the data on/from the recording medium according to the read recording speed information;
   reading write strategy parameters associated with a specific recording speed, the write strategy parameters including write power and pulse timing for recording the data on the recording medium; and
   reading recordable speed information indicating whether a specific recording speed is applicable to the recording medium,
   wherein the fourth information is used to indicate one or more basic recording speeds and represents whether said one or more basic recording speeds are applicable to the recording medium,
   wherein the recordable speed information indicates the specific recording speed in a bit position, and
   wherein the recordable speed information is configured in a manner that a bit position for a higher recording speed indicates that the higher recording speed is applicable or inapplicable if a bit position for a lower recording speed indicates that the lower recording speed is applicable, and the bit for the higher recording speed indicates only that the higher recording speed is inapplicable if the bit for the lower recording speed indicates that the lower recording speed is inapplicable.

2. The method of claim 1, wherein at least one of the maximum, minimum and predetermined recording speeds is the at least one basic recording speed.

3. The method of claim 1, wherein the recordable speed information has a priority to determine an applicability of the specific recording speed over the recording speed information.

4. An apparatus for recording/reproducing data on/from a recording medium, comprising:
   an optical pickup configured to read recording speed information from a specific area of the recording medium and write the data on the recording medium, the recording speed information including a first information used to indicate a first recording speed as a maximum recording speed, a second information used to indicate a second recording speed as a minimum recording speed, a third information used to indicate a third recording speed as a predetermined recording speed different from the maximum and minimum recording speeds, and a fourth information used to indicate a fourth recording speed as a basic recording speed, wherein at least one basic recording speed has to be supported by the recording medium;
   a servo unit, operatively coupled to the optical pickup, configured to control a servo operation of the optical pickup according to a specific recording speed;
   a memory configured to store the recording speed information read from the optical pickup; and
   a controller, operatively coupled to the optical pickup, the servo unit and the memory, configured to identify the recording speed information and control the optical pickup to write the data according to the identified recording speed information,
   wherein the fourth information is used to indicate at least one basic recording speed and represents whether said at least one basic recording speed is applicable to the recording medium and the optical pickup is configured to read the fourth information, wherein the controller is configured to further identify write strategy parameters associated with a specific recording speed, the write strategy parameters including write power and pulse timing for recording the data on the recording medium, and control the optical pickup to record the data using the write strategy parameters at the specific recording speed, wherein the optical pickup is configured to further read a recordable speed information indicating whether a specific recording speed is applicable to the recording medium and the controller is configured to control the optical pickup to record the data based on the recordable speed information, the recordable speed information indicating the applicability of the specific recording speed in a bit position, wherein the recordable speed information is configured in a manner that a bit position for a higher recording speed indicates that the higher recording speed is applicable or inapplicable if a bit position for a lower recording speed indicates that the lower recording speed is applicable, and the bit for the higher recording speed indicates only that the higher recording speed is inapplicable if the bit for the lower recording speed indicates the lower recording speed is inapplicable, wherein the controller is configured to control the optical pickup to record the data based on the recordable speed information.

5. The apparatus of claim 4, wherein at least one of the maximum, minimum and predetermined recording speeds is the at least one basic recording speed indicated by the fourth information and the optical pickup is configured to read the fourth information.

6. The apparatus of claim 4, wherein the recordable speed information has a priority to determine the applicability of the specific recording speed over the recording speed information and the controller is configured to further control the optical pickup to record the data based on the recordable speed information prior to the recording speed information.

7. A method for recording/reproducing data on/from a recording medium, comprising:

reading control information from the recording medium, wherein the control information includes a first speed information field indicating a maximum recording speed, a second speed information field indicating a minimum recording speed, a third speed information field indicating one or more basic recording speeds, and a fourth speed information field indicating a predetermined recording speed different from the maximum and minimum recording speeds, wherein the third speed information field represents whether said one or more basic recording speeds are applicable to the recording medium or not; and recording/reproducing the data on/from the recording medium according the read control information, wherein the third speed information field represents by each bit position within one information byte whether said one or more basic recording speeds are applicable to the recording medium or not, wherein the control information further comprises an applicable recording speed information indicating an applicability of a specific recording speed, wherein the applicable recording speed information represents the specific recording speed in a bit position to indicate the applicability, and wherein the applicable recording speed information is configured in a manner that a bit position for a higher recording speed indicates that the higher recording speed is applicable or inapplicable if a bit position for a lower recording speed indicates that the lower recording speed is applicable, and the bit for the higher recording speed indicates only that the higher recording speed is inapplicable if the bit for the lower recording speed indicates that the lower recording speed is inapplicable.

8. The method of claim 7, wherein at least one of the maximum, minimum and predetermined recording speeds is at least one basic recording speed.

9. The method of claim 7, wherein the applicable recording speed information has a priority to determine the applicability of the specific recording speed over the first and fourth speed information.

10. The method of claim 7, wherein the control information further comprises write strategy information indicating write strategy parameters applicable to a recording of the data on the recording medium, the write strategy parameters including write power and pulse timing for recording the data one the recording medium at a specific recording speed.

11. An apparatus for recording/reproducing data on/from a recording medium, comprising:

an optical pick-up configured to read control information from the recording medium and record the data on the recording medium, wherein the control information includes a first speed information field indicating a maximum recording speed, a second speed information field indicating a minimum recording speed, a third speed information field indicating one or more basic recording speeds, and a fourth speed information field indicating a predetermined recording speed different from the maximum and minimum recording speeds, wherein the third speed information represents whether each of the basic recording speeds are applicable to the recording medium or not;

a servo unit, operatively coupled to the optical pick-up, configured to control a servo operation of the optical pick-up according to a specific recording speed; and a controller, operatively coupled to the optical pick-up and servo unit, configured to control the optical pick-up to record the data according to the read control information, wherein the third speed information field represents by each bit position within one information byte whether said one or more basic recording speeds are applicable to the recording medium or not and the optical pick-up is configured to read the third speed information, wherein the control information further comprises an applicable recording speed information indicating an applicability of a specific recording speed and the controller is configured to control the optical pick-up to record the data based on the applicable speed information, the applicable speed information indicating the applicability of the specific recording speed in a bit position, wherein the applicable recording speed information is configured in a manner that a bit position for a higher recording speed is set to indicate that the higher recording speed is applicable or inapplicable if a bit for a lower recording speed is set to indicate that the lower recording speed is applicable, and the bit for the higher recording speed is set to indicate only that the higher recording speed is inapplicable if the bit for the lower recording speed is set to indicate that the lower recording speed is inapplicable, and wherein the controller is confirmed to control the optical pick-up to record the data based on the applicable recording speed information.

12. The apparatus of claim 11, wherein at least one of the maximum, minimum and predetermined recording speeds is at least one basic recording speed and the controller is configured to control the optical pick-up to read the control information.

13. The apparatus of claim 11, wherein the applicable recording speed information has a priority to determine the applicability of the specific recording speed over the first and fourth speed information and the controller is configured to further control the optical pick-up to record the data based on the applicable speed information.

14. The apparatus of claim 11, wherein the control information further comprises write strategy information indicating write strategy parameters applicable to a recording of data on the recording medium, the write strategy parameters including write power and pulse timing for recording the data one the recording medium at a specific recording speed, and the controller is configured to control the optical pick-up to record the data based on the write strategy information at the specific recording speed.

* * * * *